United States Patent Office.

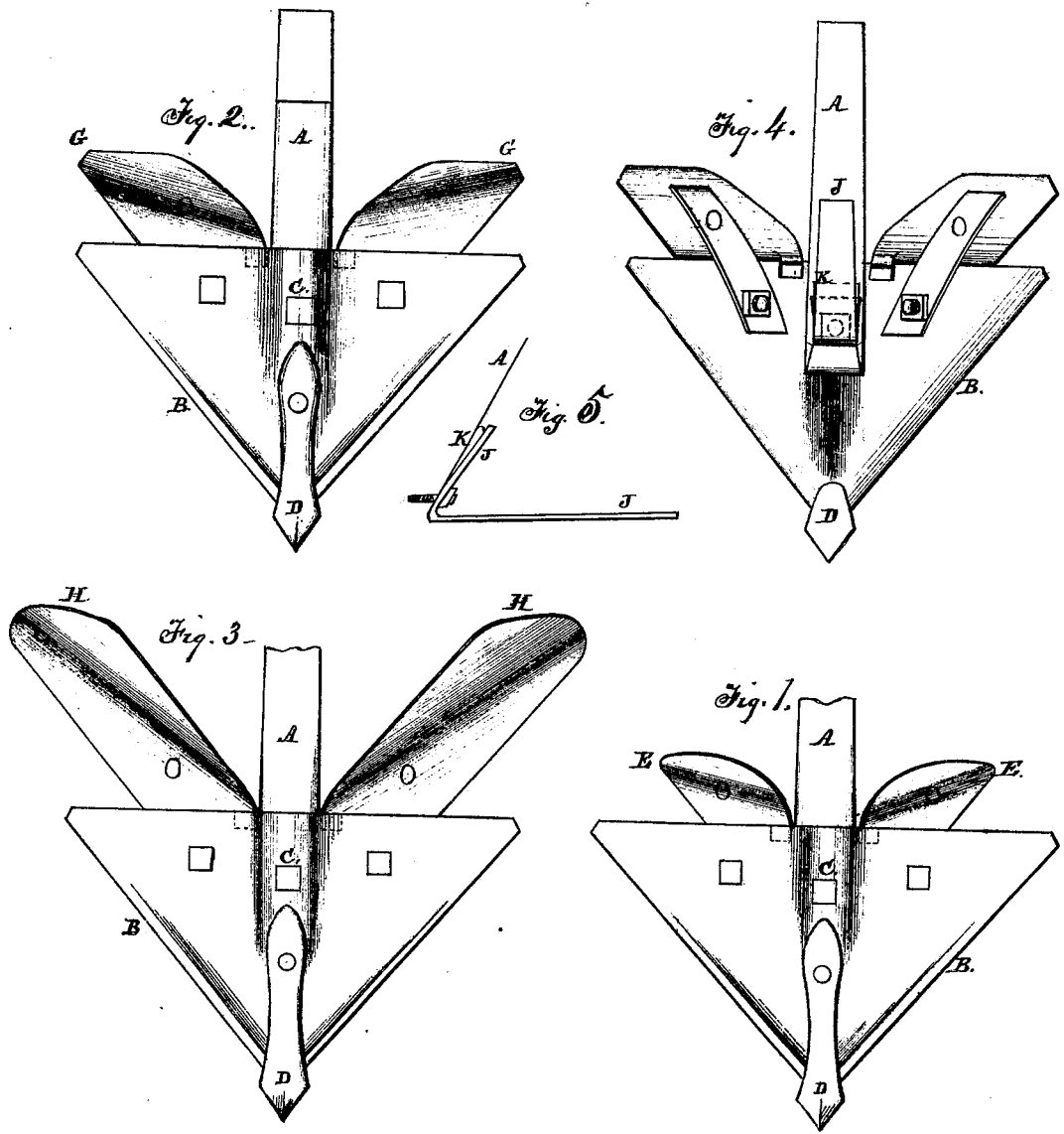

WILLIAM O'NEILL, OF PINE LEVEL, ALABAMA.

*Letters Patent No. 91,157, dated June 8, 1869; antedated May 28, 1869.*

IMPROVEMENT IN PLOWS.

The Schedule referred to in these Letters Patent and making part of the same.

*To all whom it may concern:*

Be it known that I, WILLIAM O'NEILL, of Pine Level, county of Montgomery, and State of Alabama, have invented new and useful Improvements in Plows; and I do hereby declare the following to be an exact description thereof, reference being had to the accompanying drawings, and to the letters of reference marked thereon, making a part of this specification.

The nature of my invention consists in the construction, arrangement, and combination of the different-sized mould-boards, landslide, with adjustable wedge, and duckbill-point, as hereinafter set forth.

Figure 1 represents the front part of the sweep or turning-plow, with small-sized movable mould-boards bolted to the plow.

Figure 2 exhibits the plow with a larger or second-sized mould-board.

Figure 3 exhibits the plow with the third or largest-sized mould-board.

Figure 4 shows the back side of the plow, how the mould-boards are fastened to the plow, the landslide, foot of stock, and the wedge between the stock and landslide.

Figure 5 represents a side view of the landslide, and the wedge between it and the foot of the stock.

A represents the foot of the plow-stock, to which the sweep or turning-plow B is nutted and bolted, with the head of the bolt C countersunk, so that the front of the plow is perfectly smooth, and free from clogging.

D is the duckbill or additional point, bolted to the plowshare, to protect and give more strength to the point of the share, and make it take the land better, and wear longer.

For the first plowing, I use the small-sized mould-boards E E, for small corn or cotton; and, if the share does not throw enough, I use the second size larger, G G, at the next plowing, which throws the additional quantity of dirt necessary to cover up the grass in the drill, or around the young corn or cotton; and, if the middle of the rows has any grass or weeds, I use the left-hand mould-board to cover it up, thereby cleaning drill and middle at the same time.

The long or largest-sized mould-boards H H, I use to throw the dirt further and higher, and are best adapted to plow out the middles of rows in low, wet lands, to make a good water-furrow, to drain the land.

The lower angular and adjustable bar or landslide J is used to make the plow or sweep B run steady, and of an even depth, holding it up at the corners and hindmost part, thereby giving it the proper set to take the land rightly.

I use a small wedge, K, between the landslide J and the foot of stock A, to regulate the landslide J.

By placing the wedge K in front of the head-pin, it turns the end of the bar J upward, and makes the sweep B run more flat; but, by using it behind the head-pin, as shown at fig. 5, it turns the other end of the bar J downward, and thus raises the plow higher behind, so that I obtain any pitch or set required.

By my arrangement and combination, I produce a sweep or turning-plow, right or left, double or single, and adjustable to shallow or deep plowing, and covering small or larger growths of corn and cotton; therefore,

What I claim as my invention, and desire to secure by Letters Patent, is—

The additional improvement to my patent of September 13, 1859, viz, the mode of adjusting the landslide J by the wedge K, as herein described, and for the purpose set forth.

WILLIAM O'NEILL.

Witnesses:
  W. H. GRAVES,
  W. L. LEWIS.